J. Hornig.

Metal Shears.

No. 3,717. Reissued Nov. 9, 1869.

Witnesses;

Theo. Tusch
C. L. Topliff.

Inventor;

Julius Hornig
per Munn & Co
attys.

N. PETERS, PHOTO-LITHOGRAPHER, WASHINGTON, D. C.

United States Patent Office.

JULIUS HORNIG, OF CHICAGO, ILLINOIS.

*Letters Patent No.* 46,237, *dated February* 7, 1865; *reissue No.* 3,717, *dated November* 9, 1869.

IMPROVED MECHANISM FOR CONVERTING ROTARY MOTION INTO OSCILLATING MOTION.

The Schedule referred to in these Letters Patent and making part of the same.

*To all whom it may concern:*

Be it known that I, JULIUS HORNIG, of Chicago, in the county of Cook, and State of Illinois, have invented new and improved Combinations of Mechanical Devices, Applicable to Machines for Shearing Metals, and equally applicable to other machines, designed for other purposes, and which are especially useful as a means of converting rotary motion into oscillating motion; and I do hereby declare that the following is a full, clear, and exact description thereof, which will enable others skilled in the art to make and use the same, reference being had to the accompanying drawings, forming part of this specification.

This invention relates to a new combination of devices for converting rotary into oscillating motion, with a view of retaining, as near as possible, the power applied to the rotary shaft, and of relying entirely upon such power, not requiring any additional springs, weights, or other apparatus liable to get out of order.

The invention consists in the combination of an eccentric on the driving-shaft, with a strap fitted around such eccentric, with an ear projecting from the strap and with the lever to be rocked, said lever being pivoted to the ear; and also in the combination, with said eccentric strap, ear, and lever, of a segmental protuberance on the upper end of said lever, which plays directly against the edge of the cam.

In the accompanying drawing I have represented the invention applied to the machinery for operating a shear, although I do not confine the use of the invention to this particular application.

Figure 5:
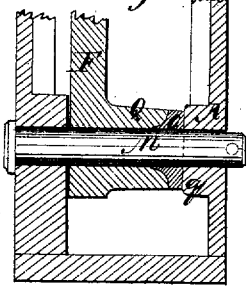
Figure 7:
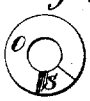
Figure 8:
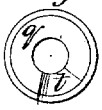
Figure 1:
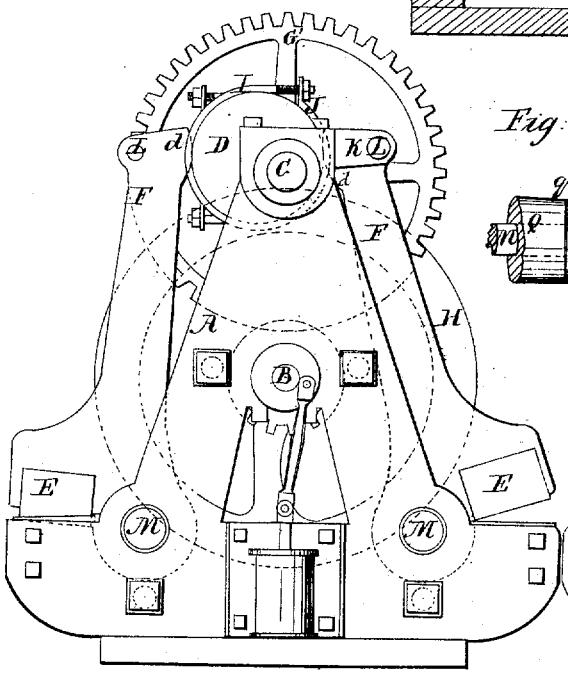
Figure 1 represents a side elevation of my invention.
Figure 6:
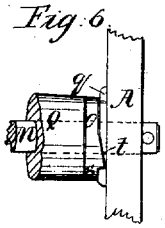
Figure 2:
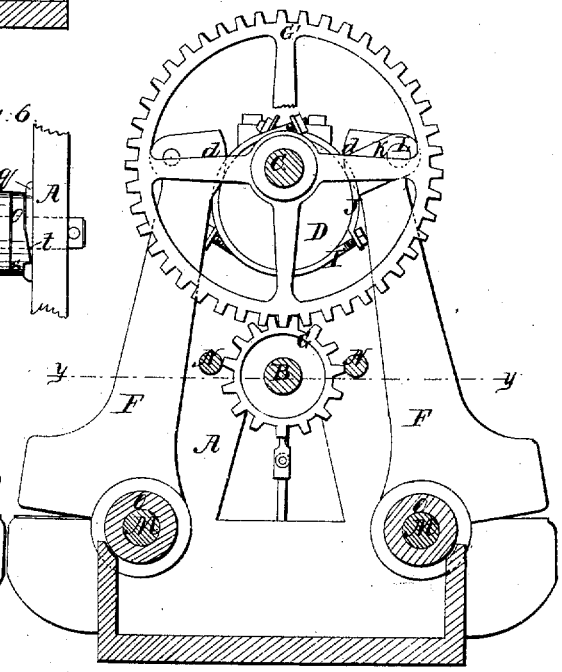
Figure 2 is a vertical section of the same, taken on the plane of the line *x x*, fig. 4.
Figure 3:
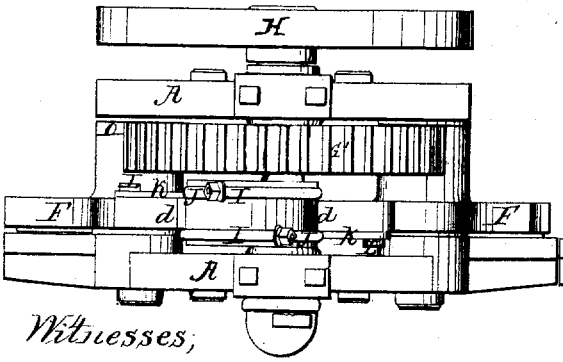
Figure 3 is a plan or top view of the same.
Figure 4:
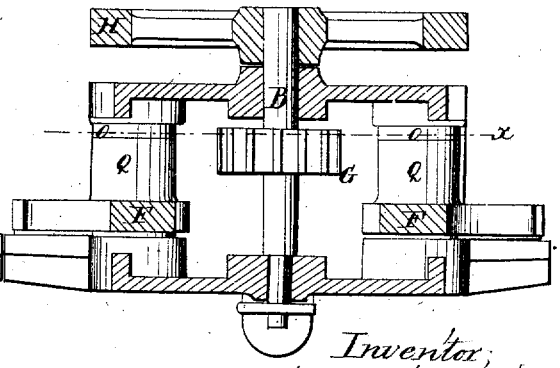
Figure 4 is a horizontal section of the same, the plane of section being indicated by the line *y y*, fig. 2.

Figures 5, 6, 7, and 8, are detail views of the lower lever-pivot and appendages.

Similar letters of reference indicate corresponding parts.

A, in the drawing, represents the frame, which supports the rotary shaft C, from which motion is to be transmitted.

The shaft C is hung horizontally in proper bearings, and receives rotary motion, by gearing G G′, from a driving-shaft, B, or in suitable manner, from any other suitable mechanism.

F is the lever to be oscillated.

It is, by a pin, M, pivoted to the frame A, or to any other stationary frame.

Upon the shaft C is mounted a circular eccentric, D.

Around this eccentric is applied a strap, I, which has a projecting ear, K, rigidly affixed to it.

I prefer to form the ear K on a section, J, of the ring, and to connect such section, by means of nuts, with the remaining portion of the strap, as shown.

The outer end of the ear K is, by a pin, L, pivoted to the end of the lever F.

The distance between the pivots L M and C M should be exactly equal.

The lever is, by the strap and ear, held in connection and absolute contact with the eccentric D.

That portion, *d*, of the edge of the lever, which is, during the motion of the mechanism, brought in contact with the eccentric, is made segmental, the curve being described from the pin L as centre.

While the shaft revolves with the eccentric, the latter slides in the strap and causes the latter to move back and forth, together with the ear K.

The pin L is thereby moved nearer to and further away from the shaft C, and causes the lever F to move with it, swinging on the pivot M.

The segmental edge *d*, of the lever F, is, during the entire motion, held in constant contact with the edge of the eccentric, but the points of contact are changed as the eccentric changes its position.

The oscillating motion thus produced can be used for working punches or shears E, or for other suitable purposes.

The apparatus may be doubled by connecting the eccentric D, or two separate eccentrics of the same shaft, by separate straps, I, ears K, and pivots, L, with two separate levers, F, as shown in the drawing, so that one shaft may oscillate two or more such levers.

The pivot M may be fixed, to let the lever swing on it, or it may be made to swing with the lever.

Having thus described my invention,

I claim, as new, and desire to secure by Letters Patent—

1. The combination of mechanism, applicable to the conversion of rotary into oscillating motion, consisting of the shaft C, carrying the eccentric D, of the strap I, ear K, pivot L, and lever F, all arranged to operate substantially as herein shown and described.

2. The combination of the curved edge *d* and lever F, with the eccentric strap and ear, substantially as herein shown and described.

JULIUS HORNIG.

Witnesses:

GEO. W. MABEE,

ALEX. F. ROBERTS.